No. 644,225. Patented Feb. 27, 1900.
H. J. ELSNER.
MOTOR CAR.
(Application filed Dec. 2, 1899.)
(No Model.)

WITNESSES:
Ella L. Giles

INVENTOR
Hans Joachim Elsner
BY
Richard
ATTORNEYS.

UNITED STATES PATENT OFFICE.

HANS JOACHIM ELSNER, OF KALK, GERMANY.

MOTOR-CAR.

SPECIFICATION forming part of Letters Patent No. 644,225, dated February 27, 1900.

Application filed December 2, 1899. Serial No. 739,022. (No model.)

*To all whom it may concern:*

Be it known that I, HANS JOACHIM ELSNER, engineer, a subject of the King of Prussia, German Emperor, residing at Kalk, near Köln, in the Kingdom of Prussia, German Empire, have invented certain new and useful Improvements in Electric Motors of Motor-Cars, of which the following is a full, clear, and exact description.

The present invention relates to a novel arrangement of the electric motors of motor-cars with steering-wheels located on adjustable axle-shafts and which are each driven by a motor capable of revolving around the same vertical axis as the respective axle-shaft. This arrangement consists, briefly, in placing the springs supporting the motor on a lever by means of the corresponding adjustment of which the steering-wheels are controlled. The motor-cars already known, in which the two steering-wheels are each driven by a motor fixed to the rotary axle-shafts, present considerable defects. Either the motors cannot be mounted on springs at all or the spring-mounting must be secured on the car-body, which makes it impossible for the wheels to turn around more than about ninety degrees, or else the motors must be spring-mounted on the axle-shafts themselves. Moreover, the axle-shafts are subjected to great strain by the suspension and jolting of the motor. All these defects are effectually obviated by means of the arrangement forming the object of this invention, which is illustrated in the accompanying drawings, in which—

Figure 1:
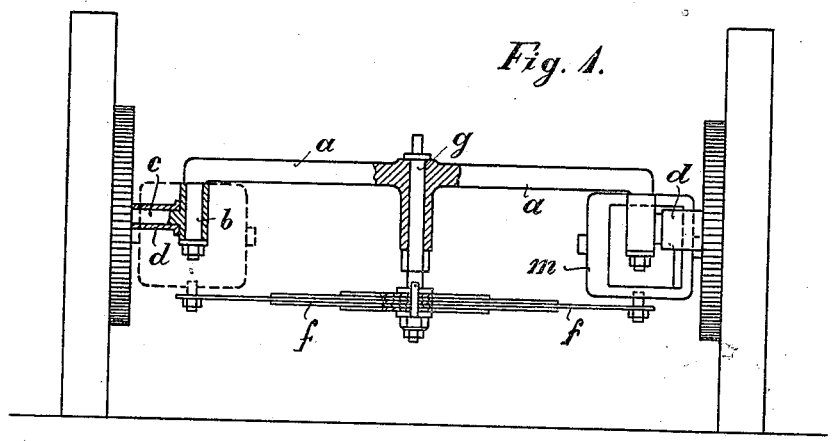
Figure 2:
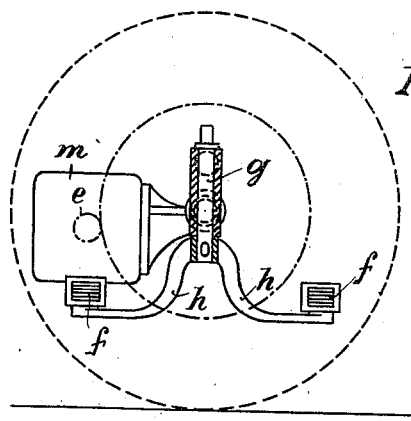
Figure 3:
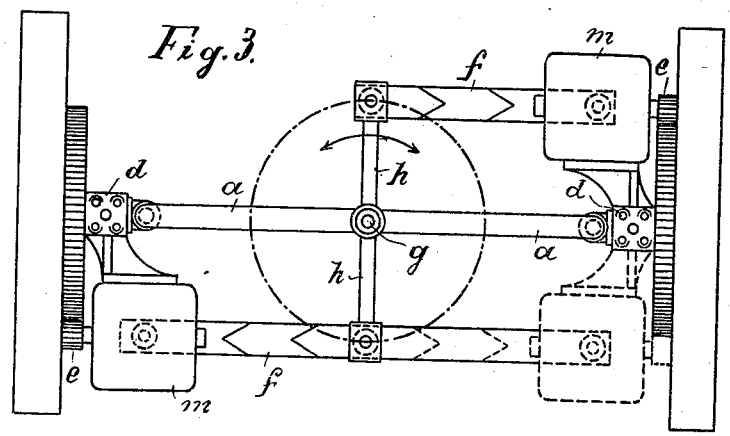

Figure 1 shows the arrangement of the motor in elevation. Fig. 2 is the corresponding side elevation. Fig. 3 is a plan of the same.

The axle $a$, fixed upon the frame of the car, possesses the revolving pivots $b$, bent around at right angles, upon which the axle-shafts $c$, bearing the steering-wheels, can revolve. The gear-wheel $e$, located on the axle of the motor $m$, engages with the toothed wheel attached to each steering-wheel. A bearing $d$, fastened to the motor, engages around the rotary axle-shaft $c$, so that the distance of the motor remains always the same and the rotary axle-shaft must follow the movements of the motor. The motor itself is supported by means of a spring $f$ from the arm $h$, revoluble around the vertical shaft $g$. The spring $f$ is attached at or near the center of gravity of the motor and is pivotally connected with the arm $h$ as well as with the motor.

Instead of arranging both motors at different sides of the axis $a$ they may be arranged at the same side of said axis, as shown in Fig. 3 by dotted lines.

By means of the arrangement described it is attained that, on the one hand, all jolts caused by the motors and their movements are directly transmitted to the fixed axle, and consequently there is no strain on the axle-shafts, and that, on the other hand, the car can be steered directly by means of a corresponding movement of the lever. If the lever $b$ is turned in either direction around the vertical shaft $g$, this movement will cause the motors $m$ to turn around the center of rotation of the corresponding axle-shaft on account of the bearings $d$ encircling the rotary axle-shaft $c$. Thus the steering-wheels are turned in the required manner without altering their parallel position with regard to one another or the engagement of the gear-wheels.

As by means of this invention the wheels are able to turn about one hundred and eighty degrees, the car can be turned around within the space it stands upon, if any of the usual means for overcoming the dead-point are made use of.

Having now described my invention, what I claim as new, and desire to secure by Letters Patent, is—

In motor-cars the combination of steering-wheels located on adjustable axle-shafts with a motor, which is revolved around the same axis as its corresponding axle, for each wheel, springs supporting the motors and a lever supporting the springs and pivoted on the first axle, said lever serving as steering means for the wheels, substantially as set forth and described.

In witness whereof I have hereunto set my hand in presence of two witnesses.

HANS JOACHIM ELSNER.

Witnesses:
ERICH SIEG,
JOSEF LÜDICKE.